US008587404B2

(12) United States Patent
Laird

(10) Patent No.: US 8,587,404 B2
(45) Date of Patent: Nov. 19, 2013

(54) MOVABLE BARRIER OPERATOR AND TRANSMITTER WITH IMMINENT BARRIER MOVING NOTIFICATION

(75) Inventor: Edward T. Laird, Lombard, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 1079 days.

(21) Appl. No.: 12/409,584

(22) Filed: Mar. 24, 2009

(65) Prior Publication Data

US 2010/0242369 A1 Sep. 30, 2010

(51) Int. Cl.
*B60R 25/00* (2013.01)

(52) U.S. Cl.
USPC .......... 340/5.7; 340/5.71; 340/426.15; 116/2; 116/6; 116/8; 49/30; 49/31; 49/357; 49/358

(58) Field of Classification Search
USPC ......... 340/5.7, 5.71, 12.4, 12.5, 13.24, 13.25, 340/686.1, 691.6, 693.1, 426.15, 426.22, 340/426.28; 49/30, 31, 357, 358, 506, 507; 116/2, 4, 9, 10, 12, 6, 8; 318/268, 468, 318/480, 484, 565; 455/41.2, 63.1, 404.1, 455/552.1, 556.1, 566
See application file for complete search history.

(56) References Cited

U.S. PATENT DOCUMENTS 5,565,843 A * 10/1996 Meyvis ...................... 340/691.6
6,239,569 B1 * 5/2001 Fitzgibbon et al. ........... 318/480
6,278,249 B1 * 8/2001 Fitzgibbon et al. ........... 318/268
6,308,083 B2 * 10/2001 King .......................... 455/556.1
6,326,754 B1 12/2001 Mullet et al.
7,038,409 B1 5/2006 Mullet
7,315,143 B2 1/2008 Mullet et al.
2005/0012631 A1 * 1/2005 Gregori et al. ............. 340/686.1
2005/0024230 A1 * 2/2005 Chuey ...................... 340/825.72
2005/0176400 A1 * 8/2005 Mullet et al. .................. 455/403
2006/0158339 A1 * 7/2006 Brundula ................... 340/686.1

* cited by examiner

*Primary Examiner* — Steven Lim
*Assistant Examiner* — Sisay Yacob
(74) *Attorney, Agent, or Firm* — Fitch, Even, Tabin & Flannery LLP

(57) ABSTRACT

A movable barrier system with a moving-barrier imminent motion notification includes a movable barrier and a movable barrier operator connected to control movement of the movable barrier between a first position and a second position. To reduce user dissatisfaction with the moving-barrier imminent motion notification, communications to the movable barrier operator include information to assist the operator in determining whether to operate the moving-barrier imminent motion notification in combination with moving the door or to specifically command that the moving-barrier imminent motion notification operate or not. The communication may include a signal or input separate from and in addition to a typical command signal or input to the operator. By other approaches, the method of communication can provide information to the operator with respect to operation of the moving-barrier imminent motion notification, or a transmitter identifier can provide information with respect to operation of the moving-barrier imminent motion notification.

22 Claims, 4 Drawing Sheets

400

300

MOVABLE BARRIER OPERATOR AND TRANSMITTER WITH IMMINENT BARRIER MOVING NOTIFICATION

TECHNICAL FIELD

This invention relates generally to barrier movement operators and more specifically to the operation of barrier movement operators with imminent barrier moving notification systems.

BACKGROUND

Systems for operating and controlling various types of barriers such as garage doors, swing gates, sliding gates, and the like are well known. To increase security, movable barrier systems have been developed that include an auto-close feature such that barriers that remain open for a given amount of time without user input are automatically closed. Such systems may also include an imminent moving notification system designed to alert people both prior to and during the door's closing so that people may avoid the closing door. Timer-to-close with imminent moving notification has been in operators for years.

In addition to the possibility of the auto-close feature, the movable barrier systems may be configured to be operated by a user from a distance or a location that is remote from the barrier. In such a circumstance, the user may not know whether any people are in the vicinity of a barrier actuated to move by the user. For example, a movable barrier system may be configured to be operated via a security system that a user can access via a centralized control, the Internet, or a conventional mobile communication device. In such systems, the user may be able to close a barrier without having any information regarding people that may be located next to the barrier. In such circumstances, it is advantageous to include the notification feature to warn those near the barrier of the barrier's imminent movement when actuated to move by a user that is not present at the barrier.

Such imminent movement notification, however, typically include a delay in barrier motion in addition to light provision, sound provision, or partial movement of the barrier as a notification of imminent barrier movement. The operator or user of the movable barrier system may be located near the door such that delay in the operation of the movable barrier system can result in user frustration because the user will typically expect immediate operation of the movable barrier operator upon actuation by the user. Therefore, there is a need to differentiate inputs that are received locally or within sight of the operator (either physically or by a camera) as opposed to inputs that can be generated from a long distance or not within sight of the operator.

SUMMARY

Generally speaking, pursuant to these various embodiments, a movable barrier system with a moving-barrier imminent motion notification includes a movable barrier and a movable barrier operator connected to control movement of the movable barrier between a first position and a second position. To reduce user dissatisfaction with the moving-barrier imminent motion notification, communications to the movable barrier operator include information to assist the operator in determining whether to operate the moving-barrier imminent motion notification in combination with moving the door or to specifically command that the moving-barrier imminent motion notification to operate or not. The communication may include a signal or input separate from and in addition to a typical command signal or input to the operator. By another approach, the method of communication can provide information to the operator with respect to operation of the moving-barrier imminent motion notification. By still another approach, a transmitter identifier can provide information to the operator with respect to operation of the moving-barrier imminent motion notification. Other approaches are possible as may become apparent through study of the following disclosure.

The movable barrier operator in one example is configured to receive a first command from a transmitter and to move the movable barrier in combination with operating a moving-barrier imminent motion notification in response to receipt of the first command. The movable barrier operator is also configured to receive a second command and to move the movable barrier without operating the moving-barrier imminent motion notification in response to receipt of the second command. By one approach, the first command comprises a signal that triggers operation of the moving-barrier imminent motion notification. The signal can be at least one selected from the group consisting of a transmission method identification code, a code value, a code format, a signal frequency, and a signal modulation to evidence that the command is coming from a remote location where the user is unlikely to be in visual contact with the movable barrier. So configured, the movable barrier operator may operate with or without operating the moving-barrier imminent motion notification based upon the type of commands received by the movable barrier operator.

By another approach, the movable barrier operator is configured to receive a transmitter identification code from a transmitter as part of a communication from the transmitter. The transmitter identification code helps the movable barrier operator to determine whether to move the movable barrier in combination with operating a moving-barrier imminent motion notification in response to receipt of a command based at least in part on the transmitter identification code. The movable barrier operator is configured to determine whether to move the movable barrier without operating the moving-barrier imminent motion notification based at least in part on the transmitter identification code. Typically, the movable barrier operator is configured to move the movable barrier in combination with operating the moving-barrier imminent motion notification when the transmitter identification code indicates that the transmitter is located remotely of the movable barrier.

By still another approach, a movable barrier system with a moving-barrier imminent motion notification includes a movable barrier and a movable barrier operator connected to control movement of the movable barrier between a first position and a second position. The movable barrier operator in this approach includes a communication connection comprising at least one of a direct wireless connection to a transmitter, a local wire connection, a system wired connection, a network connection, and a wireless communication system connection. The movable barrier operator also includes a processor configured to receive a command from the communication connection. In response to receiving the command from one of the system wired connection, the network connection, and the wireless communication system connection, the processor is configured to move the movable barrier operator in combination with operating a moving-barrier imminent motion notification in response to receipt of the command. The processor is also configured to operate the movable barrier operator in response to receiving the command from the direct wireless connection to the transmitter and the local wire connection without operating the moving-barrier imminent motion notification. In this approach, by determining how the command was received, via the communication connection, the movable barrier operator may operate either with or without the moving-barrier imminent motion notification. For instance, by receiving the command to operate via a local wire connection, it is likely that a user is in visual contact with the movable barrier such that operating the movable barrier operator in conjunction with operating the moving-barrier imminent motion notification is not needed. Similarly, the movable barrier operator may be operated in combination with the moving-barrier imminent motion notification when the processor receives a command via a network connection because it is likely that the user is not in visual communication with the movable barrier when operating the system via network connection.

A method of operating a movable barrier system with a moving-barrier imminent motion notification includes operating the movable barrier systems described above. For example, one method of operating a movable barrier system with a moving-barrier imminent motion notification includes receiving a communication at one of a plurality of communication connections comprising at least a first set of communication connections and a second set of communication connections. The method includes operating the moving-barrier imminent motion notification in combination with moving the movable barrier in response to receiving the communication over one of the first set of communication connections and operating the movable barrier system without operating the moving-barrier imminent motion notification in response to receiving the communication over one of the second set of communication connections. So configured, the movable barrier system will operate or move the movable barrier in combination with the moving-barrier imminent motion notification based on which type of communication connection over which the system received the command to operate.

Another approach to the method includes the steps of receiving a communication from a transmitter and operating the moving-barrier imminent motion notification in combination with moving the movable barrier in response to receiving a signal with the communication from the transmitter. This method includes moving the movable barrier in response to receiving the communication without operating the moving-barrier imminent motion notification when receiving the communication without the signal from the transmitter. In this approach, the signal with the communication may comprise a code, a transmitter identification code, or a type of signal modulation that indicates to the movable barrier system that the communication was likely sent by the user from a position where the user is not in visual contact with the movable barrier.

One approach to a transmitter for use with a movable barrier system with a moving-barrier imminent motion notification includes a memory that stores at least a first code containing a command to effect an action by the movable barrier system and a second code containing information regarding the transmitter. A processor is configured to send a communication containing at least in part the first code and the second code in response to a user command. The communication is configured to trigger the action by the movable barrier operator and to provide the information regarding the transmitter to the movable barrier operator to determine whether to move the movable barrier with or without operating the moving-barrier imminent motion notification. The second code is any type of code, transmitter identification, or signal formatting that would provide information to the movable barrier operator regarding whether to move the movable barrier in combination with operating the moving-barrier imminent motion notification, for example, in a situation where the user is likely to not be in visual contact with the movable barrier.

An example method of operating a transmitter for use with a movable barrier system with a moving-barrier imminent motion notification includes operating the transmitter described above. By one approach, the method includes receiving a user input and sending, in response to receiving the first user input, a communication configured to trigger the movable barrier operator to move a movable barrier. The communication also provides information regarding the transmitter to the movable barrier operator to determine whether to move the movable barrier with or without operating the moving-barrier imminent motion notification.

By another approach, the method may include receiving a first user input and sending, in response to receiving the first user input, a communication configured to trigger the movable barrier operator to move a movable barrier in combination with operating the moving-barrier imminent motion notification. The method also includes receiving a second user input and sending, in response to the receiving the second user input, a second communication configured to trigger the movable barrier operator to operate without operating the moving-barrier imminent motion notification. So configured, the first communication triggers the movable barrier operator to operate without activating the moving-barrier imminent motion notification in situations where it is likely that the user is in visual contact with the movable barrier or would prefer to not have the movable barrier imminent motion notification activated so as to reduce user annoyance with the moving-barrier imminent motion notification. The second communication indicates to the movable barrier operator that the user is either not in visual contact either locally or via a camera with the movable barrier or would prefer to operate the movable barrier operator in conjunction with the moving-barrier imminent motion notification.

So configured, a movable barrier system provides the ability to selectively use the moving-barrier imminent motion notification in combination with moving a barrier. User annoyance with the moving-barrier imminent motion notification as may occur when the imminent motion notification includes a delay in moving the movable barrier can thereby be reduced by eliminating (or at least reducing) the delay when the user can likely see the moving barrier. Such a system may still operate a moving-barrier imminent motion notification when the user is not in visual contact with the moving door, for example, when the user is located in a remote location or operating the door via a security system. These and other benefits may become clearer upon making a thorough review and study of the following detailed description.

BRIEF DESCRIPTION OF THE DRAWINGS

The above needs are at least partially met through provision of the movable barrier operator and transmitter with barrier imminent motion notification described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE PREFERRED EMBODIMENT(S)

Figure 1:
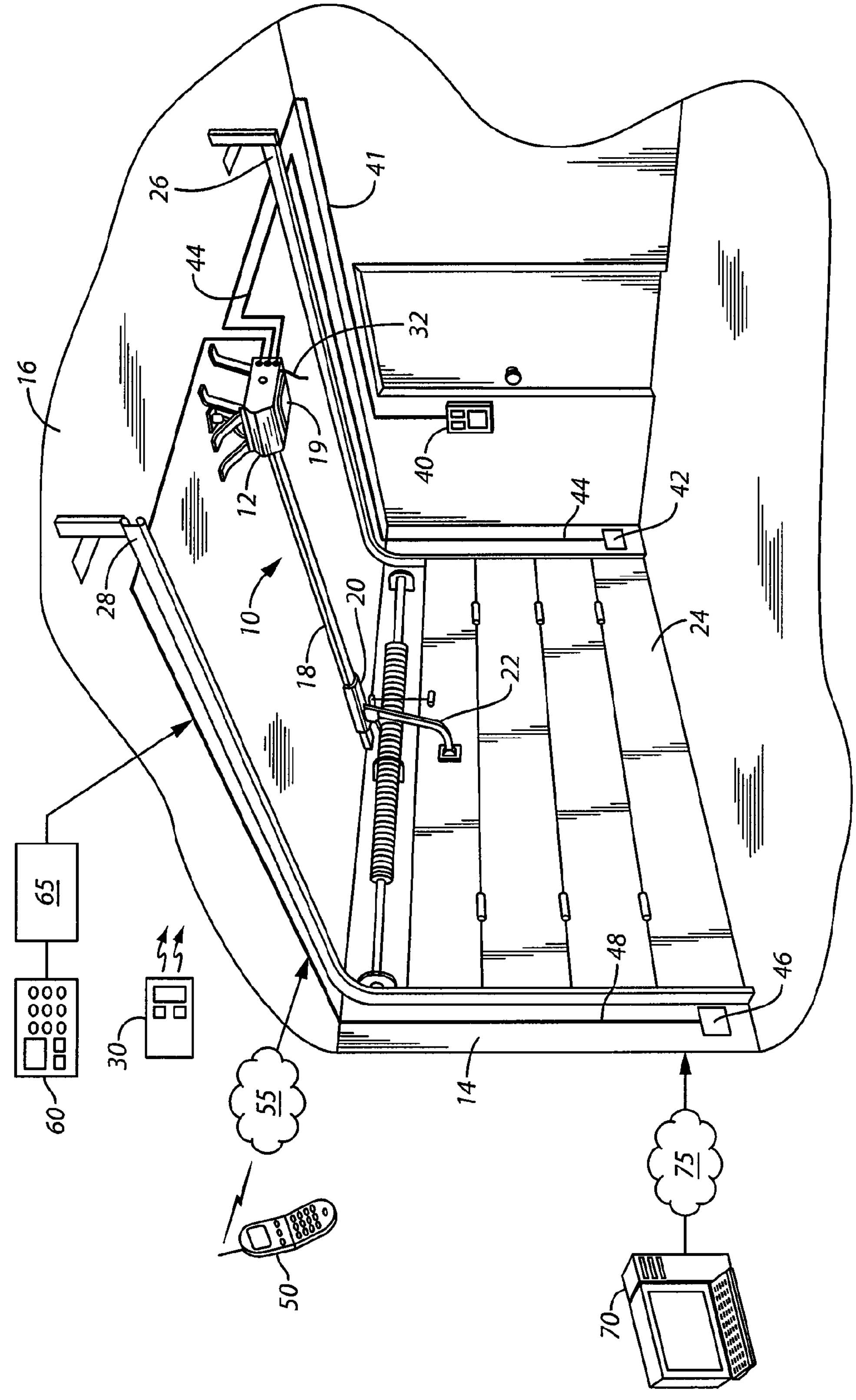
FIG. 1 comprises a perspective view of a garage and various transmitters as may communicate with a movable barrier operator as configured in accordance with various embodiments of the invention.

Referring now to the drawings, especially FIG. 1, an example movable barrier system 10 including a movable barrier operator 12, here a head unit, mounted within a garage 14 and employed for controlling the opening and closing of the movable barrier 24, here a garage door, is generally shown. The movable barrier operator 12 is mounted to the ceiling 16 of the garage 14. The movable barrier operator 12 includes a motor and an operator controller for controlling electrical power supplied to the motor. The operator controller for the movable barrier system 10 responds to various inputs by starting and stopping the motor, which is used to move the barrier, and by turning a light 19 on and off. Extending from the movable barrier operator 12 is a rail 18 having a releasable trolley 20 attached thereto and arm 22 extending from the trolley 20 to a multiple paneled garage door 24 positioned for movement along a pair of door rails 26 and 28. The movable barrier operator 12 transfers the garage door 24 between open and closed positions for allowing access to and from the garage 14.

For safety purposes, an optical emitter 42 and optical detector 46 are provided. These are coupled to the movable barrier operator 12 by a pair of wires 44 and 48. The emitter 42 and detector 46 are used to provide safety of operation in barrier movement. To provide such safety of operation, the controller responds to the emitter 42 and detector 46 and will reverse and open the door if an obstruction is sensed in the doorway.

At least one wireless transmitter unit 30 is adapted to send signals to the antennas 32 positioned in, on, or extending from the movable barrier operator 12. The antenna 32 is coupled to a receiver located within the movable barrier operator 12. A wall mounted wired transmitter 40, which may include any number of switches as required for a given system, is mounted on a wall of the garage 14. The wired transmitter 40 communicates with the movable barrier operator 12 through a direct physical wired connection 41 to the movable barrier operator 12 using any commonly known method of communication, including serial bus communication. A variety of other communication options may be available to allow a user to communicate with and control the movable barrier system 10. By one example, a mobile communication device 50 is configured to send signals through a wireless communication network 55 to the movable barrier operator 12 to control operation of the movable barrier system 10. Mobile communication devices 50 such as mobile phones and other mobile devices are known. Another example includes a security system interface 60 configured to send signals via a security system 65, such as a home security system or other building security system, to the movable barrier operator 12 to control operation of the movable barrier system 10. Such communication paths between security systems and mobile barrier operators are readily configurable by one skilled in the art. Still another example includes a networked communication device 70, such as a computer or similar device, that communicates through a network 75, such as the Internet or a local network, to the movable barrier operator 12 to control operation of the movable barrier system 10. Other communication paths and devices are possible. Each of these communication devices can be called a transmitter in that each transmits signals to the movable barrier operator 12, and the communication path for each device to the movable barrier system 10 is readily configurable by those skilled in the art.

An additional security/convenience feature is the provision of an overhead light 19 (also sometimes referred to as a workspace light). The movable barrier operator 12 includes an overhead light 19 for illuminating the interior of the garage 14 in which the movable barrier operator 12 is located. The light 19 is activated or deactivated either by pressing the appropriate switch on the wall mounted controller 40, by breaking the optical beam that runs between the optical emitter 42 and the optical detector 46, or by sending a command from another source.

By one approach, a movable barrier system 10 with a moving-barrier imminent motion notification includes a movable barrier 24 and a movable barrier operator 12 connected to control movement of the movable barrier 24 between a first position and a second position. The movable barrier operator 12 is configured to receive a first command from a transmitter and to move the movable barrier 24 in combination with operating a moving-barrier imminent motion notification in response to receipt of the first command. The moving-barrier imminent motion notification may comprise a number of methods of notification to people in the vicinity of the movable barrier system 10 to indicate that the movable barrier 24 is about to move or is in the process of moving. The moving-barrier imminent motion notification may include, for example, flashing of the light 19, starting and stopping of movement of the door 24, sounding of a noise from a sound emitter (not shown), a combination of the above, or any other method known in the art. The movable barrier operator 12 is also configured to receive a second command and to move the movable barrier 24 without operating the moving-barrier imminent motion notification in response to receipt of the second command.

In one approach, the first command includes a first signal triggering movement of the movable barrier 24 and a second signal triggering operation of the moving-barrier imminent motion notification in combination with movement of the movable barrier 24. For example, the first signal may be any signal or code that is typically used to trigger the operation of the movable barrier system 10 to move the movable barrier 24 between an open position and a closed position. The second signal in this example may comprise any further signal that indicates to the movable barrier operator 12 to operate the moving-barrier imminent motion notification in combination with movement of the movable barrier 24. The second signal may include at least one of the group consisting of a transmission method identification code, a code value, a code format, a signal frequency, and a signal modulation.

The transmission method identification code comprises a code that identifies to the movable barrier operator 12 the transmission method used to send the signal to the movable barrier operator 12. The transmission method identification code may be included in the information sent from the transmitter to the movable barrier operator 12. For example, the transmission method identification code may be included in an identification code typically sent with almost every communication between the transmitter and the movable barrier operator 12. By another example approach, the transmission method identification code may be sent primarily when the transmission method indicates to the movable barrier operator 12 that the user is not within visual contact with the movable barrier 24. In still another approach, the transmission method identification code may be sent when the transmission method indicates to the movable barrier operator 12 that the user is within visual contact with the movable barrier 24.

A code value may be a value of a code sent as part of the transmission between the transmitter and the movable barrier operator 12 such that when the movable barrier operator 12 receives the code value, the movable barrier operator 12 is triggered to operate the moving-barrier imminent motion notification in combination with movement of the movable barrier 24. The code value may be included anywhere within the transmission of the information sent by the transmitter to the movable barrier operator 12.

With respect to code formats, for example, fixed code or rolling code formats with and without encryption as known in the art, codes may be sent in a number of formats between communicating devices. One or more particular code formats used for communication between a transmitter and the movable barrier operator 12 may be set aside such that when the movable barrier operator 12 receives a transmission using one of the particular code formats, the movable barrier operator 12 operates the moving-barrier imminent motion notification in combination with the movable barrier 24 or otherwise responds in a particular way.

Signals, such as radio frequency or other wireless transmission carriers, may be sent between the transmitter and receiver for the movable barrier operator 12 according to a variety of frequencies or modulations. By one approach, one or more signal frequencies may be set aside such that when the movable barrier operator 12 receives a communication from a transmitter over a particular signal frequency, the movable barrier operator is triggered to operate the moving-barrier imminent motion notification in combination with moving the movable barrier 24. Signals may also be modulated in a number of different ways; thus, the transmitter may be configured to communicate with the movable barrier operator 12 via a variety of signal modulations. One or more of these signal modulations may be set aside such that when the movable barrier operator 12 receives a communication from the transmitter via one of their particular signal modulations, the movable barrier operator 12 is triggered to operate the moving-barrier imminent motion notification in combination with moving the movable barrier 24. For example, should the movable barrier operator 12 receive a communication from a transmitter not using a signal modulation that has been set aside, the movable barrier operator is not triggered to operate the moving-barrier imminent motion notification in combination with moving the movable barrier 24.

In a different approach, a movable barrier system 10 with a moving-barrier imminent motion notification includes a movable barrier 24 and a movable barrier operator 12 connected to control movement of the movable barrier 24 between a first position and a second position. In this approach, the movable barrier operator 12 is configured to receive a transmitter identification code from a transmitter as part of a communication from the transmitter and to determine whether to move the movable barrier 24 in combination with operating the moving-barrier imminent motion notification in response to receipt of a command based at least in part on the transmitter identification code. The movable barrier operator 12 is also configured to determine whether to move the movable barrier 24 without operating the moving-barrier imminent motion notification based at least in part on the transmitter identification code. In this approach, the transmitter identification code communicates to the movable barrier operator 12 a type of transmitter that is used to send the communication. Using this information, the movable barrier operator 12 is able to determine the likelihood that the user is located within sight of the movable barrier 24. As discussed above, the transmitter for any of these approaches may comprise any of the group consisting of a wireless transmitter 30, a wired transmitter 40, a network communication device 70, a mobile communication device 50, and a security system interface 60. From this information, the movable barrier operator 12 can determine whether to operate the moving-barrier imminent motion notification in combination with moving the movable barrier 24 such that should the user be within sight of the movable barrier 24, the moving-barrier imminent motion notification will not be operated in combination with movement of the movable barrier 24. So configured, the movable barrier operator 12 is configured to move the movable barrier 24 in combination with operating a moving-barrier imminent motion notification when the transmitter identification code indicates that the transmitter is located remotely of the movable barrier 24.

Figure 2:
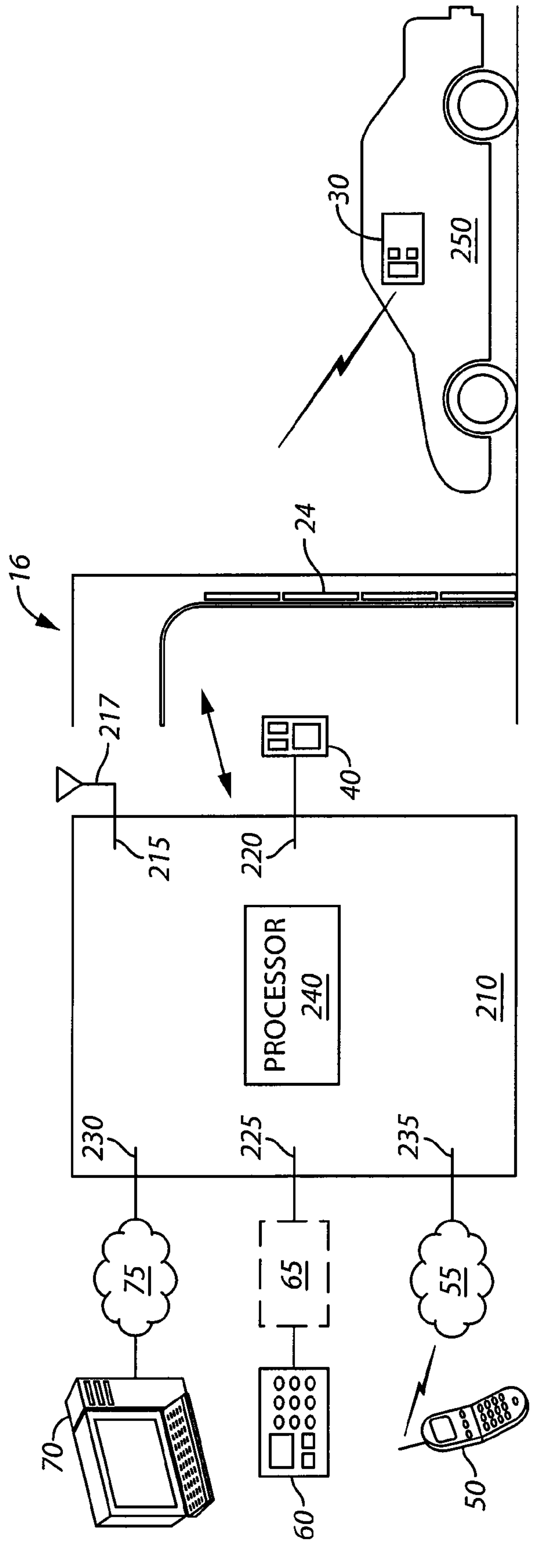
FIG. 2 comprises a diagram of a movable barrier system configured in accordance with various embodiments of the invention.

With reference to FIG. 2, still another approach to the movable barrier system with a moving-barrier imminent motion notification will be described. In this approach, the movable barrier operator 210 includes a communication connection comprising at least of the group consisting of a direct wireless connection 215 to a transmitter, a local wire connection 220, a system wired connection 225, a network connection 230, and a wireless communication system connection 235. Other communication connections may be possible including any of the known methods of communicating with transmitters to send/receive information at the movable barrier operator 210 to affect control of the operator 210 such as to trigger movement of the movable barrier 24.

The movable barrier operator 210 also includes a processor 240 configured to receive a command from the communication connection. The processor 240 is also configured to move the movable barrier 24 in combination with operating a moving-barrier imminent motion notification in response to receipt of a command from one of the system wired connection 225, the network connection 230 and the wireless communication system connection 235. The processor 240 is also configured to move the movable barrier 24 without operating the moving-barrier imminent motion notification in response to receiving the command from the direct wireless connection 215 to the transmitter and from the local wired connection 220.

So configured, the movable barrier operator 210 determines from the type of connection over which the communication was received whether to operate the moving-barrier imminent motion notification in combination with moving the movable barrier 24. For instance, communications received from a direct wireless transmitter, for example, a wireless transmitter 30 located in a car 250 communicating directly to the movable barrier operator 210 via its antenna 217 and/or a transceiver (not shown), or from a direct wired connection 220 via a wall mounted wire transmitter 40 located in the garage 16, indicate that the user is likely in visual contact with the movable barrier 24. Therefore, the movable barrier operator 210 operates the movable barrier 24 between the open or closed position without operating the moving-barrier imminent motion notification to reduce user annoyance. When the movable barrier operator 210, however, receives communications over one of the other communication connections, for example, from a computer 70, a security system interface 60, or from a mobile communication device 50, it is likely (or at least more likely) that the user is not in visual contact with the movable barrier 24 when providing that command. Therefore, in those circumstances, the movable barrier operator 210 operates the moving-barrier imminent motion notification in combination with moving the movable barrier 24 to alert any people that may be in the vicinity as to the closing of the door 24.

A method of operating the movable barrier system 10 with a moving-barrier imminent motion notification will be described with reference to FIG. 3. An example method 300 includes the step 310 of receiving a communication from a transmitter. The method 300 includes at step 320 operating the moving-barrier imminent motion notification in combination with moving a movable barrier in response to receiving a signal with the communication from the transmitter. At step 330, the method 300 includes moving the movable barrier in response to receiving the communication without the signal from the transmitter. In this approach, the communication received from the transmitter is reviewed to determine whether there is an indication that the moving-barrier imminent motion notification should be operated in response to receipt of the communication. Such a signal may come in a variety of forms. By one approach, the step of receiving the signal with the communication from the transmitter includes receiving one of the group consisting of a transmission method identification code, a code value, a code format, a signal frequency, and a signal modulation, each of which has been described above. The step of receiving the communications from the transmitter may be performed in any one of a number of ways. For example, the step may include receiving a wireless communication at the movable barrier system directly from the transmitter or receiving the communication via a wired connection between the movable barrier system and the transmitter. Another approach includes receiving a communication via a network connection providing a communication path to the movable barrier system from the transmitter. Still another approach includes receiving the communication via a wireless communication system.

Figure 3:
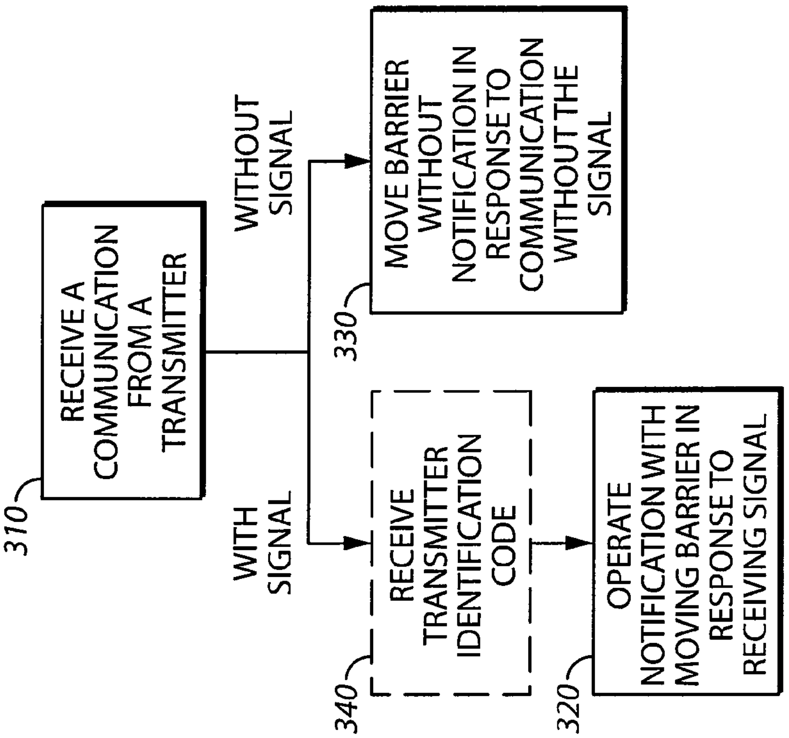
FIG. 3 comprises a flow diagram of an example method of operation of a movable barrier system with a moving-barrier imminent motion notification as configured in accordance with various embodiments of the invention.

In still another approach to the method 300 of FIG. 3, a step 340 of receiving a transmitter identification code that identifies the transmitter type for the transmitter is included. In this approach, the determination of whether to operate a moving-barrier imminent motion notification in combination with moving the movable barrier is based at least in part on the transmitter identification code. In such an approach, the step 320 of operating the movable door imminent motion notification with moving the movable barrier in response to receiving the signal is performed when it is determined that the transmitter identification code identifies a transmitter type that is likely to be used by a user that is not in visual contact with or in the vicinity of the movable barrier. Should the transmitter identification code identify the transmitter as being a type used by a user that is in the vicinity of the movable barrier, step 330 is performed such that the movable barrier is moved without operation of the moving-barrier imminent motion notification in response to receiving the communication.

Figure 4:
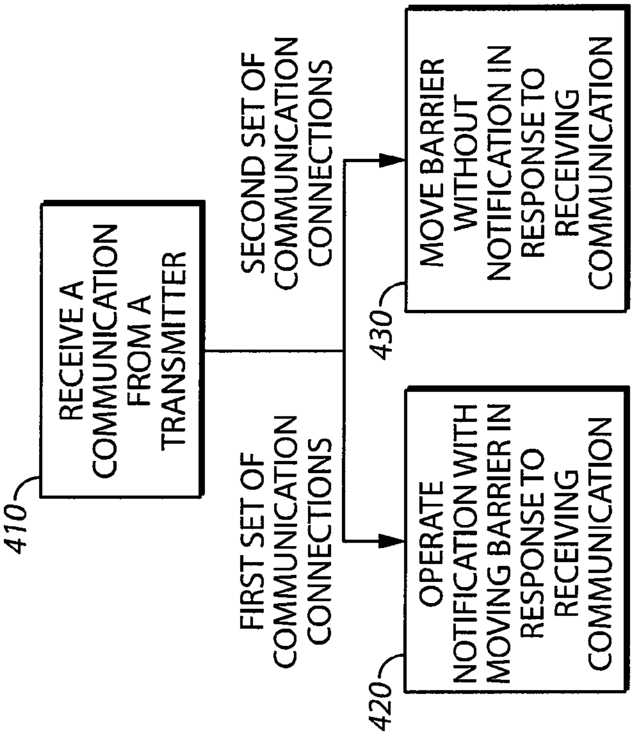
FIG. 4 comprises a flow diagram of another example method of operation of a movable barrier system with a moving-barrier imminent motion notification as configured in accordance with various embodiments of the invention.

With reference to FIG. 4, another method 400 of operating a movable barrier system with the moving-barrier imminent motion notification includes at step 410 receiving a communication at one of a plurality of communication connections comprising at least a first set of communication connections and a second set of communication connections. The method 400 includes at step 420 operating the moving-barrier imminent motion notification in combination with moving a movable barrier in response to receiving the communication over one of the first set of communication connections. At step 430, the method 400 includes operating the movable barrier system without operating the moving-barrier imminent motion notification in response to receiving the communication over one of the second set of communication connections. In this approach and with brief reference to FIG. 2, the first set of communication connections may comprise at least one of the group consisting of the system wired connection 225, a network connection 230, and a wireless communication system connection 235. The second set of communication connections may include at least one of the group consisting of the direct wireless connection 215 and the local wire connection 220. So configured, the movable barrier operator 210 determines from the type of connection over which the communication was received whether to operate the moving-barrier imminent motion notification in combination with moving the movable barrier 24. For instance, communications received from a direct wireless transmitter, for example a wireless transmitter 30 located in a car 250, or from a direct wired connection 220 via a wall mounted wire transmitter 40 located in the garage 16 indicate that the user is likely in visual contact with the movable barrier 24. Therefore, the movable barrier operator 210 moves the movable barrier 24 without operating the moving-barrier imminent motion notification to thereby reduce user annoyance. When the movable barrier operator 210, however, receives communications over one of the other communication connections, for example, from a computer 70, a security system interface 60, or from a mobile communication device 50, it is likely that the user is not in visual contact with the movable barrier 24 when providing that command. Therefore, in those circumstances, the movable barrier operator 210 operates the moving-barrier imminent motion notification in combination with moving the movable barrier 24 to thereby alert any people that may be in the vicinity as to the closing of the door 24.

Figure 5:
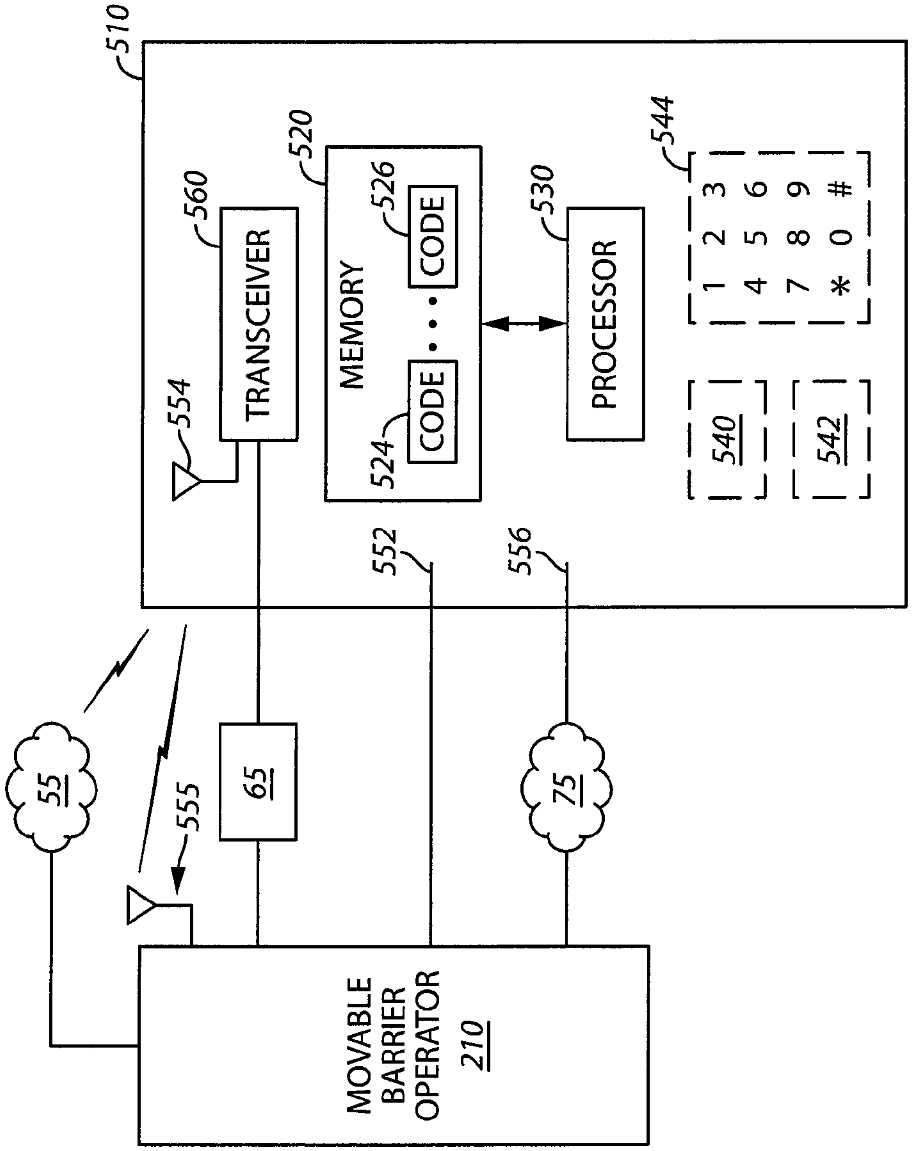
FIG. 5 comprises a block diagram of a transmitter configured to work with a movable barrier system with a moving-barrier imminent motion notification as configured in accordance with various embodiments of the invention.

With reference to FIG. 5, a transmitter 510 for use with a movable barrier operator 210 with a moving-barrier imminent motion notification will be described. The movable barrier operator 210 is configured to receive a command from the transmitter 510 and to move the movable barrier 24 in combination with operating the moving-barrier imminent motion notification in response to receipt of the command. The transmitter 510 includes a memory 520 that stores at least a first code 524 containing a command to effect an action by the movable barrier operator 210 and a second code 526 containing information regarding the transmitter 510. The transmitter 510 also includes a processor 530 configured to send a communication containing at least in part the first code 524 and the second code 526 in response to a user command. One skilled in the art will recognize and appreciate that such a processor 530 can comprise a fixed-purpose hard-wired platform or can comprise a partially or wholly programmable platform to direct other elements to send the communication. All of these architectural options are well known and understood in the art. The communication itself is configured according to a suitable format to trigger the action by the movable barrier operator 210 and to provide the information regarding the transmitter 510 to the movable barrier operator 210 such that the movable barrier operator 210 can determine whether to move the movable barrier 24 with or without the moving-barrier imminent motion notification.

As described above, the transmitter 510 may comprise any of a number of forms. Such a transmitter 510 may include user actuable buttons 540 and 545, and/or the transmitter 510 may include a keyboard 544. Depending on its configuration, the transmitter 510 may include one of the group consisting of a wired connection 552 to the movable barrier operator 210, an antenna 554 configured to send the communication directly to a transceiver 555 with the movable barrier operator 210, a network connection 556 providing a communication path to the movable barrier operator 210, a transceiver 560 configured to send the communication via a wireless communication system 55, and a transceiver 560 configured to send the communication via a wired security system connection 65. In this approach, the second code may comprise at least one of the group consisting of the transmitter identification code, a transmission method identification code, a code value, a code format, signal frequency, and a signal modulation to trigger the movable barrier operator 210 to move the movable barrier 24 in combination with operating the moving-barrier imminent motion notification.

Another method of operating the transmitter 510 for use with the movable barrier operator 210 with the moving-barrier imminent motion notification includes receiving a user input and sending a communication in response to receiving the user input. The communication is configured to trigger the movable barrier operator 210 to move a movable barrier 24 and to provide information regarding the transmitter 510 to the movable barrier operator 210 such that the movable barrier operator 210 determines whether the move the movable barrier 24 with or without operating the moving-barrier imminent motion notification.

In yet still another approach, a method of operating a transmitter 510 for use with a movable barrier operator 210 with a moving-barrier imminent motion notification includes receiving a first user input and sending in response to receiving the first user input a first communication configured to trigger the movable barrier operator 210 to move a movable barrier operator 24 in combination with operating the moving-barrier imminent motion notification. The method also includes receiving a second user input and sending in response to receiving a second user input a second communication configured to trigger the movable barrier operator 210 to operate without operating the moving-barrier imminent motion notification. By this approach, the transmitter allows the user to determine whether the movable barrier 24 should be moved in combination with operation of the moving-barrier imminent motion notification by providing separate inputs for operating the movable barrier operator 210 with or without operating the moving-barrier imminent motion notification.

So configured, a movable barrier system provides the ability to selectively use the moving-barrier imminent motion notification in combination with moving a barrier. Such a configuration can reduce user annoyance when operating a movable barrier as may occur when the imminent motion notification includes a delay in moving the movable barrier upon receipt of a command from the user. Such a system may still operate a moving-barrier imminent motion notification when the user is not in visual contact with the moving door, for example, when the user is located in a remote location or operating the door via a security system.

Those skilled in the art will recognize that a wide variety of modifications, alterations, and combinations can be made with respect to the above described embodiments with departing from the scope of the invention. For instance, although the described embodiment included a garage door, various types of movable barrier systems can employ these teachings, for example, swinging gates, rolling gates, rising gates, and the like. Such modifications, alterations, and combinations are to be viewed as being within the ambit of the inventive concept.

What is claimed is:

1. A movable bather system with a moving-bather imminent motion notification, the system comprising:

a movable bather operator connected to control movement of a movable barrier between a first position and a second position;

the movable barrier operator configured to receive a first command from a transmitter in response to a first user input at the transmitter, wherein the first command comprises a first signal configured to instruct the movable barrier operator to trigger closing the movable barrier and a second signal configured to instruct the movable barrier operator regarding triggering operation of the moving-barrier imminent motion notification in combination with the movement of the movable bather;

the movable barrier operator configured to determine whether the second signal instructs the movable barrier operator to trigger operation of the moving-barrier imminent motion notification in combination with the closing of the movable barrier;

the movable barrier operator configured to effect the closing of the movable barrier in combination with operating the moving-barrier imminent motion notification in response to determining that the second signal instructs the movable barrier operator to trigger operation of the moving-barrier imminent motion notification in combination with the closing of the movable barrier;

the movable barrier operator configured to receive a second command to effect the closing of the movable barrier without operating the moving-barrier imminent motion notification in response to receipt of the second command.

2. The movable barrier system of claim 1 wherein the second signal comprises at least one of the group consisting of: a transmission method identification code, a code value, a code format, a signal frequency, and a signal modulation.

3. The movable barrier system of claim 1 wherein the transmitter comprises any of the group consisting of: a wireless transmitter, a wired transmitter, a networked communication device, a mobile communication device, and a security system interface.

4. A movable barrier system with a moving-barrier imminent motion notification, the system comprising:

a movable barrier operator connected to close a movable barrier;

the movable barrier operator configured to receive a transmitter identification code from a transmitter as part of a communication from the transmitter triggered in response to a first user input at the transmitter, the communication comprising a command to close configured to effect closing of the movable barrier, the movable barrier operator also configured to determine whether to close the movable barrier in combination with operating a moving-barrier imminent motion notification in response to receipt of the command to close the movable barrier based at least in part on the transmitter identification code;

the movable barrier operator configured to determine whether to close the movable barrier without operating the moving-barrier imminent motion notification based at least in part on the transmitter identification code.

5. The movable barrier system of claim 4 wherein the movable barrier operator is configured to close the movable barrier in combination with operating a moving-barrier imminent motion notification when the transmitter identification code indicates that the transmitter is located remotely of the movable barrier.

6. The movable barrier system of claim 4 wherein the transmitter comprises any of the group consisting of: a wireless transmitter, a wired transmitter, a networked communication device, a mobile communication device, and a security system interface.

7. A method of operating a movable barrier system with a moving-barrier imminent motion notification, the method comprising:

receiving a communication from a transmitter;

determining whether the communication from the transmitter contains a signal indicating a need to operate a moving barrier imminent motion notification together with a command to close a movable barrier;

operating the moving-barrier imminent motion notification in combination with closing the movable barrier in response to determining that the communication from the transmitter contains the signal;

closing the movable barrier without operating the moving-barrier imminent motion notification in response to determining that the communication from the transmitter does not contain the signal.

8. The method of claim 7 wherein the receiving the communication from the transmitter comprises at least one of the group consisting of:

receiving a wireless communication at the movable barrier system directly from the transmitter;

receiving the communication via a wired connection between the movable barrier system and the transmitter;

receiving the communication via a network connection providing a communication path to the movable barrier system from the transmitter;

receiving the communication via a wireless communication system.

9. The method of claim 7 wherein determining that the communication from the transmitter contains the signal comprises determining that the signal comprises at least one of the group consisting of: a transmission method identification code, a code value, a code format, a signal frequency, and a signal modulation.

10. The method of claim 7 wherein determining that the communication from the transmitter contains the signal comprises determining that the signal comprises a transmitter identification code that identifies a transmitter type for the transmitter indicating that the transmitter is a distance from the movable barrier.

11. A movable barrier system with a moving-barrier imminent motion notification, the system comprising:

a movable bather operator connected to control movement of a movable barrier between a first position and a second position;

the movable barrier operator comprising:

a communication connection comprising at least one of the group consisting of: a direct wireless connection to a transmitter, a local wired connection, a system wired connection, a network connection, and a wireless communication system connection; and a processor configured to determine whether a received command for a closing the movable barrier was received from at least one of the system wired connection, the network connection, and the wireless communication system connection;

the processor configured to effect the closing of the movable barrier in combination with operating a moving barrier imminent motion notification in response to determining that the received command for the closing was received from at least one of the system wired connection, the network connection, and the wireless communication system connection;

the processor configured to determine whether the received command for the closing was received from at least one of the direct wireless connection to the transmitter and the local wired connection;

the processor configured to effect the closing of the movable barrier without operating the moving-barrier imminent motion notification in response to determining that the received command for the closing was received from at least one of the direct wireless connection to the transmitter and the local wired connection.

12. A method of operating a movable barrier system with a moving-barrier imminent motion notification, the method comprising:

receiving a communication to effect closing of a movable barrier at one or more of a plurality of communication connections comprising at least a first set of communication connections and a second set of communication connections entirely different from the first set of communication connections;

determining whether the communication was received at one or more of the first set of communication connections or one or more of the second set of communication connections;

operating the moving-barrier imminent motion notification in combination with effecting the closing of the movable barrier in response to determining that the communication was received over one or more of the first set of communication connections, wherein the first set of communication connections comprises at least one of the group consisting of: a system wired connection, a network connection, and a wireless communication system connection;

effecting the closing of the movable barrier without operating the moving barrier imminent motion notification in response to determining that the communication was received over one or more of the second set of communication connections, wherein the second set of communication connections comprises at least one of the group consisting of: a direct wireless connection to a transmitter and a local wired connection.

13. A transmitter for use with a movable barrier operator with a moving-barrier imminent motion notification, the movable barrier operator configured to receive a command from a transmitter and to move a movable barrier in combination with operating a moving-barrier imminent motion notification in response to receipt of the command, the transmitter comprising:

a memory that stores at least a first code containing a command to effect closing the movable barrier by the movable barrier operator and a second code containing information regarding whether to operate a moving-barrier imminent motion notification in combination with effecting the closing by the movable barrier operator;

a processor configured to send a communication containing at least in part the first code and the second code in response to a user command, the communication configured to trigger the closing by the movable barrier operator and to provide the information regarding whether to operate the moving-barrier imminent motion notification to the movable barrier operator such that the movable barrier operator can determine whether to close the movable barrier with or without operating the moving barrier imminent motion notification.

14. The transmitter of claim 13 further comprising at least one of the group consisting of:

a wired connection to the movable barrier operator;

an antenna configured to send the communication directly to a transceiver of the movable barrier operator;

a network connection providing a communication path to the movable barrier operator;

a transceiver configured to send the communication via a wireless communication system; and a transceiver configured to send the communication via a wired security system connection.

15. The transmitter of claim 13 wherein the second code comprises at least one of the group consisting of a transmitter identification code, a transmission method identification code, a code value, a code format, a signal frequency, and a signal modulation to trigger the movable bather operator to move the movable bather in combination with operating the moving-bather imminent motion notification.

16. A method of operating a transmitter for use with a movable bather operator with a moving-bather imminent motion notification, the movable barrier operator configured to receive communications from a transmitter and to operate the movable barrier operator in response to receipt of the communications, the method comprising:

receiving a user input;

sending, in response to receiving the user input, a communication configured to trigger the movable barrier operator to close a movable bather and to provide information regarding whether to operate the moving-barrier imminent motion notification to the movable barrier operator such that the movable barrier operator determines whether to close the movable bather with or without operating the moving-barrier imminent motion notification.

17. The method of claim 16 wherein the step of sending the communication comprises at least one of the group consisting of:

sending the communication via a wired connection to the movable barrier system;

sending the communication via an antenna configured to send at least in part the communication code directly to the movable barrier system;

sending the communication via a network connection providing a communication path to the movable barrier system;

sending the communication via a transceiver configured to send information via a wireless communication system.

18. The method of claim 16 wherein the information regarding whether to operate the moving-barrier imminent motion notification comprises at least one of the group consisting of: a transmission method identification code, a code value, a code format, a signal frequency, and a signal modulation.

19. A method of operating a transmitter for use with a movable bather operator with a moving-bather imminent motion notification, the movable barrier operator configured to receive communications from a transmitter and to operate the movable barrier operator in response to receipt of the communications, the method of operating the transmitter comprising:

receiving a first user input;

sending, in response to receiving the first user input, a first communication configured to trigger the movable bather operator to close a movable barrier in combination with operating the moving-barrier imminent motion notification based on the first communication and its method of communication, wherein the method of communication comprises at least one of the group consisting of:

sending the first communication via a network connection providing a communication path to the movable barrier system;

sending the first communication via a transceiver configured to send information via a wireless communication system.

20. A method of operating a transmitter for use with a movable barrier operator with a moving-barrier imminent motion notification, the movable barrier operator configured to receive communications from a transmitter and to operate the movable barrier operator in response to receipt of the communications, the method of operating the transmitter comprising:

receiving a first user input;

sending, in response to receiving the first user input, a first communication configured to trigger the movable bather operator to close a movable barrier in combination with operating the moving-barrier imminent motion notification based on the first communication and its method of communication, wherein the method of communication comprises at least one of the group consisting of: a transmission method identification code, a code format, a signal frequency, and a signal modulation to trigger the movable barrier operator to move the movable barrier in combination with operating the moving-bather imminent motion notification.

21. The method of claim 19 further comprising:

receiving a second user input;

sending, in response to the receiving the second user input, a second communication configured to trigger the movable barrier operator to operate without operating the moving-barrier imminent motion notification.

22. The method of claim 20 further comprising:

receiving a second user input;

sending, in response to the receiving the second user input, a second communication configured to trigger the movable barrier operator to operate without operating the moving-barrier imminent motion notification.

* * * * *

UNITED STATES PATENT AND TRADEMARK OFFICE

CERTIFICATE OF CORRECTION

PATENT NO. : 8,587,404 B2
APPLICATION NO. : 12/409584
DATED : November 19, 2013
INVENTOR(S) : Edward T. Laird It is certified that error appears in the above-identified patent and that said Letters Patent is hereby corrected as shown below:

IN THE CLAIMS:

Claim 1, Column 12, Line 20: Change "bather" to -- barrier --;
Claim 1, Column 12, Line 20: Change "moving-bather" to -- moving-barrier --;
Claim 1, Column 12, Line 22: Change "bather" to -- barrier --;
Claim 1, Column 12, Line 33: Change "bather" to -- barrier --;

Claim 11, Column 14, Line 3: Change "bather" to -- barrier --;
Claim 11, Column 14, Line 13: After "for" delete "a";

Claim 15, Column 15, Line 35: Change "bather" to -- barrier --;
Claim 15, Column 15, Line 36: Change "bather" to -- barrier --;
Claim 15, Column 15, Line 37: Change "moving-bather" to -- moving-barrier --;

Claim 16, Column 15, Line 39: Change "bather" to -- barrier --;
Claim 16, Column 15, Line 39: Change "moving-bather" to -- moving-barrier --;
Claim 16, Column 15, Line 47: Change "bather" to -- barrier --;
Claim 16, Column 15, Line 51: Change "bather" to -- barrier --;

Claim 19, Column 16, Line 10: Change "bather" to -- barrier --;
Claim 19, Column 16, Line 10: Change "moving-bather" to -- moving-barrier --;
Claim 19, Column 16, Line 19: Change "bather" to -- barrier --;

Claim 20, Column 16, Line 41: Change "bather" to -- barrier --;
Claim 20, Column 16, Line 49: Change "moving-bather" to -- moving-barrier --.

Signed and Sealed this
Thirteenth Day of May, 2014

Michelle K. Lee

Michelle K. Lee
*Deputy Director of the United States Patent and Trademark Office*